United States Patent [19]

Ellis

[11] 4,048,495
[45] Sept. 13, 1977

[54] DOUBLY-COMPENSATED DUAL-DETECTOR DENSITY LOGGING APPARATUS

[75] Inventor: Darwin V. Ellis, Paris, France

[73] Assignee: Schlumberger Technology Corporation, New York, N.Y.

[21] Appl. No.: 649,865

[22] Filed: Jan. 16, 1976

[30] Foreign Application Priority Data

Jan. 24, 1975 France .................. 75.02206

[51] Int. Cl.² .............................................. G01V 5/00
[52] U.S. Cl. ................................... 250/264; 250/269; 250/268
[58] Field of Search ............... 250/264, 265, 266, 268, 250/269, 270, 262, 252

[56] References Cited

U.S. PATENT DOCUMENTS

| | | | |
|---|---|---|---|
| 3,202,822 | 8/1965 | Kehler | 250/266 |
| 3,281,599 | 10/1966 | Baker et al. | 250/268 |
| 3,521,063 | 7/1970 | Tittman | 250/264 |
| 3,654,470 | 4/1972 | Wilson | 250/268 |
| 3,789,219 | 1/1974 | Wilson | 250/264 |
| 3,860,816 | 1/1975 | Wilson | 250/252 |
| 3,900,733 | 8/1975 | Seeman | 250/262 |

*Primary Examiner*—Davis L. Willis
*Attorney, Agent, or Firm*—Edward M. Roney; Kenneth Olsen; Jean C. Gresset

[57] ABSTRACT

A technique for determining the density of an earth formation with a logging sonde including a gamma ray source and two gamma ray detectors spaced at different distances from the source is disclosed. The count rate of the short-spaced detector is measured in two energy ranges covering back-scattered gamma rays which have undergone relatively low and high attenuations respectively. A first density correction is determined from the difference between the apparent density derived from the count rate of the long-spaced detector and the density derived from the count rate of the short-spaced detector in the energy range covering gamma rays with relatively low attenuation. A second density correction is determined from the difference between the densities derived from the two short-spaced detectors' count rates. These two density corrections are added to the apparent density to give the true formation density.

18 Claims, 2 Drawing Figures

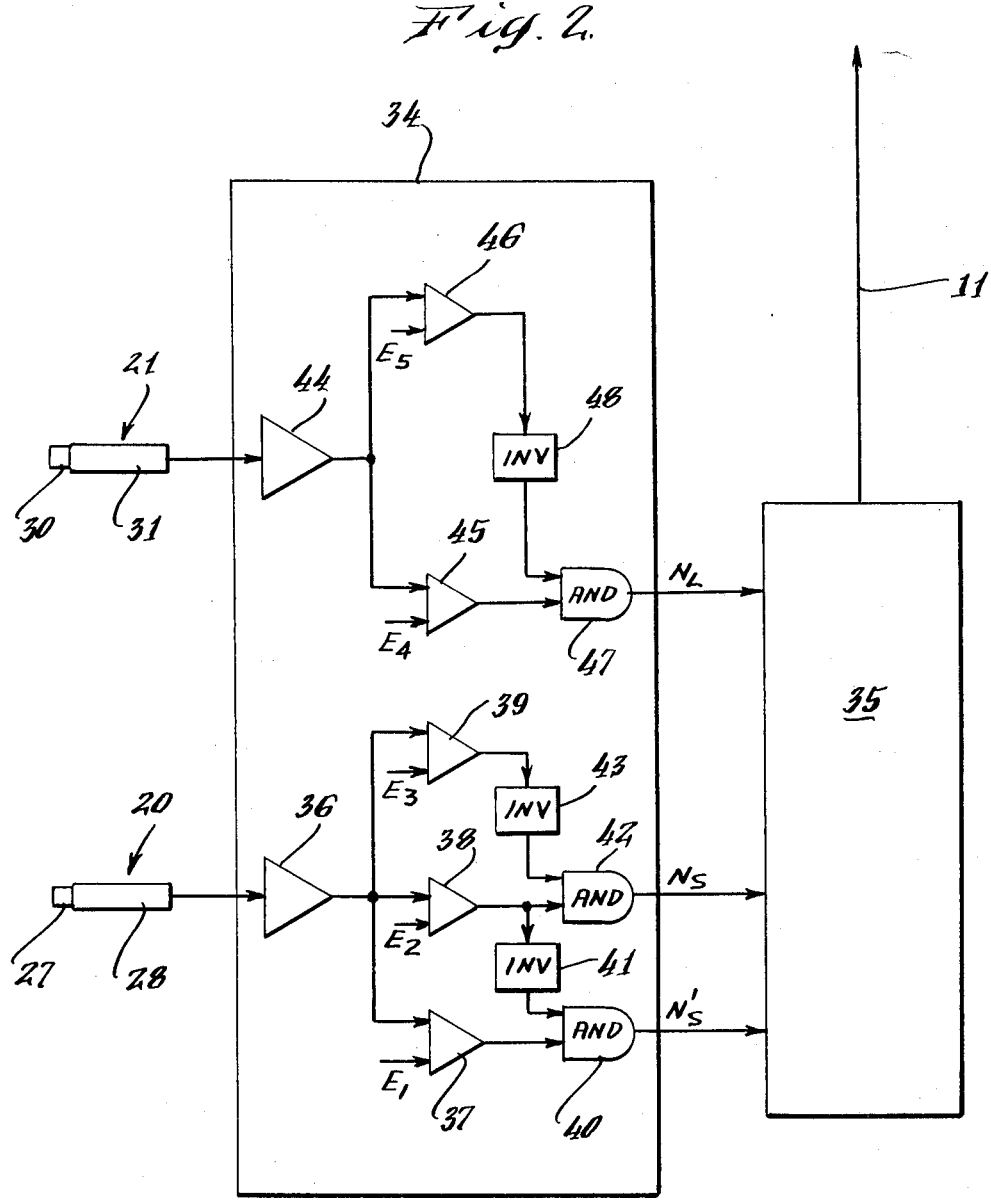

DOUBLY-COMPENSATED DUAL-DETECTOR DENSITY LOGGING APPARATUS

BACKGROUND OF THE INVENTION

The present invention relates to density logging by gamma ray irradiation of an earth formation and detection of back-scattered gamma ray radiation. More particularly, the invention concerns methods and apparatus for determining the densities of earth formations surrounding a borehole, with an improved compensation for the effect of mudcake on the borehole wall.

It is known to measure the densities of geological formations surrounding a borehole by irradiating these formations with gamma rays from a collimated source contained within a logging sonde and by detecting back-scattered gamma rays; that is, by detecting gamma rays that have been scattered back to the borehole. As the gamma rays from the source interact principally with free or loosely bound electrons, the number of the gamma rays returning to the sonde depends upon the formation density which can thus be determined.

One of the major problems encountered in density logging arises from the presence of mudcake on the borehole wall. As the mudcake is traversed twice by the detected gamma rays, the formation density derived from the count rate of these gamma rays is strongly affected by the mudcake density which is generally different from the formation density.

To obtain correct density measurements, it has previously been proposed to use two detectors spaced at different distances from the source. The near, or short-spaced, detector receives gamma rays which have diffused mainly in the materials near the borehole wall, and therefore in the mudcake. The far, or longspaced, detector receives gamma rays which have diffused principally in the formation. Moreover, in order to eliminate the influence of the average atomic number of the elements in which the radiation diffuses, the count rate of the back-scattered gamma rays detected by the detectors is measured in a restricted energy range chosen such that Compton scattering is the only consequential form of interaction with the adjacent materials. A value of uncompensated, or apparent, formation density is derived from the long-spaced count rate and a density correction is computed using both the long- and short-spaced count rates. This correction is then applied to the uncompensated value to obtain the corrected formation density. One such arrangement is described in U.S. Pat. No. 3,321,625, issued on May 23, 1967 to John Wahl.

A substantial improvement of the above method consists of both collimating the short-spaced detector and measuring its count rate in a restricted energy range covering relatively little degraded singly-scattered gamma rays, so as to increase the sensitivity to gamma rays interacting with materials contained in a thin layer immediately adjacent to the borehole wall, which may or may not include mudcake. An excellent compensation can thus be obtained for the effect of this layer, whose thickness is, typically, about 30mm. However, it is quite easy to understand that, if the above technique provides an increased sensitivity to the layer of materials immediately adjacent to the borehole wall, it also considerably reduces the compensation for the effect of the materials beyond this layer. As the mudcake thickness rarely exceeds 30mm, this limitation has consequences mainly in the case of altered shales. It frequently happens that water is absorbed by the shales over considerable thicknesses, which most often exceed 30mm. A layer of reduced density, amounting to a very thick mudcake, is thus created. As the effect of this layer is only partially corrected, the shale density measured in too low, which constitutes a serious disadvantage when one considers the importance of shales in the techniques for interpreting measurements made in boreholes.

One way of overcoming this drawback consists of reducing the lower limit of the energy range of the short-spaced count rate in order to cover back-scattered gamma rays of lower energy, which have therefore penetrated more deeply into the materials adjacent to the borehole wall. Such a solution is not satisfactory, for while increasing the depth of compensation, it also decreases very substantially the quality of the compensation for the effect of materials very near the wall. Since in most cases mudcakes have a small thickness, such a compromise is not acceptable.

It is therefore an object of the present invention to provide density logging methods and apparatus with a satisfactory compensation both for the effect of materials immediately adjacent to the borehole and for the effect of materials near the borehole but not immediately adjacent to its wall.

SUMMARY OF THE INVENTION

Briefly, in accordance with the present invention, methods for determining the density of a geological formation surrounding a borehole, irradiated by a source of gamma rays, comprise producing a measurement of the number of back-scattered gamma rays which have principally diffused in the formation, and measurements of the numbers of back-scattered gamma rays which have principally diffused respectively in at least two successive layers of materials near the borehole wall, for use in obtaining an indication of the formation density compensated for the effect of said materials.

In other words, the invention comprises producing first, second and third measurements of the numbers of back-scattered gamma rays which have principally diffused respectively (1) in the formation, (2) in materials immediately adjacent to the bore-hole, and (3) in materials near the borehole but not immediately adjacent to its wall. The three measurements can then be used to obtain an indication of the formation porosity compensated both for the effect of materials immediately adjacent to the borehole and the effect of materials near the borehole but not immediately adjacent to its wall.

More specifically, the first measurement is derived from the count rate of a detector located at a relatively long distance from the source, in an energy range covering back-scattered gamma rays whose energy has been generally degraded by Compton effect. The second and third measurements are derived from the count rate of another detector located at a relatively short distance from the source, in energy ranges covering back-scattered gamma rays which have undergone relatively low and high attenuations respectively. A density is then determined from each of these three measurements. The density derived from the first measurement reflects therefore the apparent formation density, whereas the densities derived from the second and third measurements reflect the respective densities of materials immediately adjacent to the borehole and materials near the borehole but not immediately adjacent to its wall.

Advantageously, a first density correction, representing the effect of materials immediately adjacent to the borehole wall, is computed from the difference between the first and second densities, using a first empirically derived calibration function. In a similar way, a second density correction, representing the effect of materials near the borehole, but not immediately adjacent to its wall, is computed from the difference between the second and third densities, using another empirically derived calibration function. These two density corrections are finally combined with the apparent density to obtain the doubly compensated formation density.

Typically, when a source of cesium 137 is used to irradiate the formation, the first measurement is performed in an energy window whose limits are within the range 100-200 keV and 400-600 keV respectively. The second measurement is performed in an "upper" energy window whose limits are within the range 300-360 keV and 450-600 keV, whereas the third measurement is performed in a "lower" energy window whose limits are within the range 100-200 keV and 300-360 keV.

The present invention also includes logging apparatus for implementing the above-defined methods.

The invention, both as to its organization and its manner of operation, together with further characteristics thereof, may best be understood by reference to the following description taken in conjunction with the accompanying drawings.

BRIEF DESCRIPTION OF THE DRAWINGS

FIG. 2 represents the analysis stage of the apparatus of FIG. 1.

DESCRIPTION OF THE PREFERRED EMBODIMENT

Figure 1:
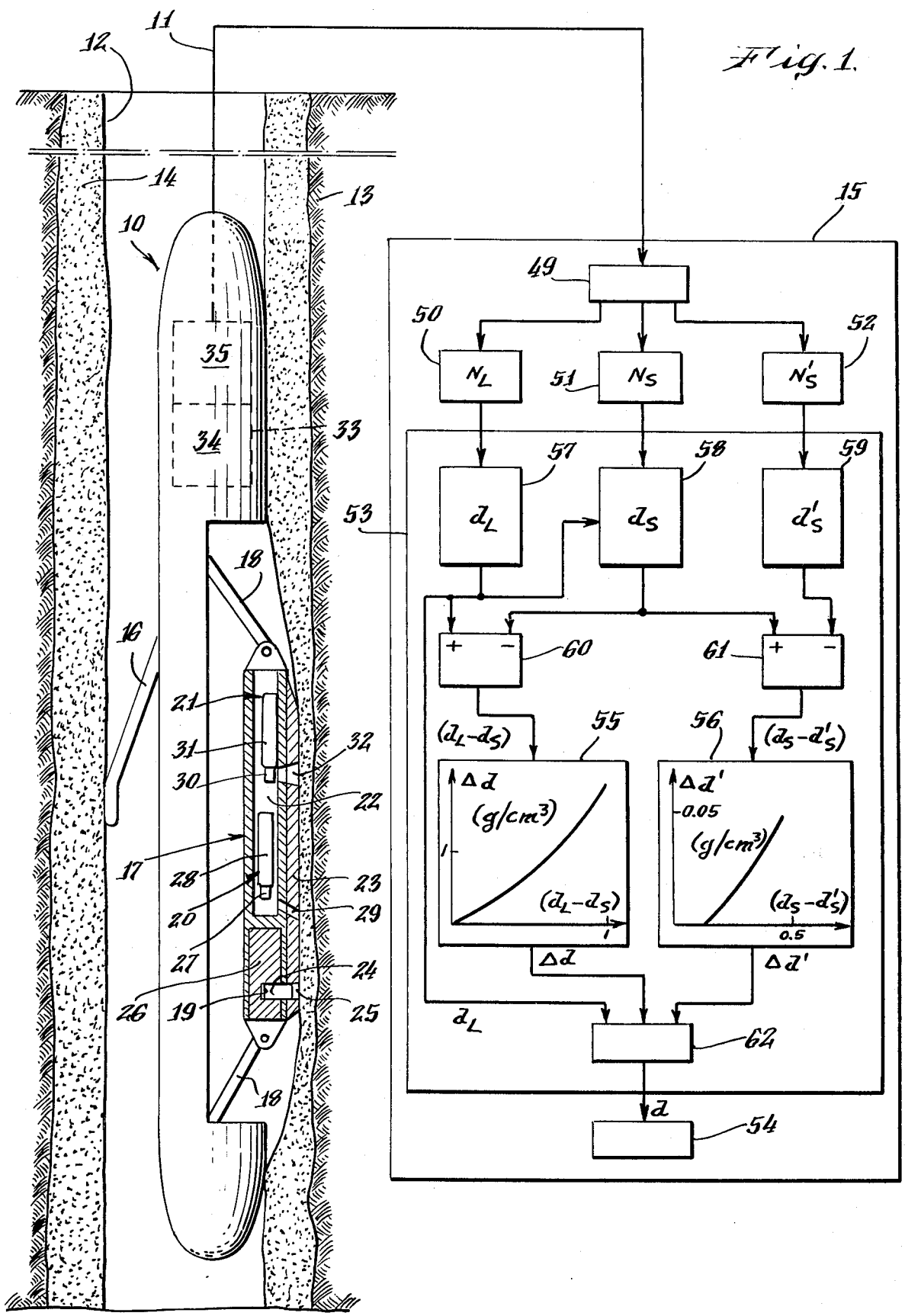
FIG. 1 is an overall schematic view of a preferred embodiment of a logging apparatus of the invention.

Referring now to FIG. 1, a logging sonde 10 is shown suspended by a cable 11 in a borehole 12 surrounded by geological formations 13. The walls of this borehole 12 are coated with a mudcake 14. The cable 11 contains insulated conductors which connect the bottom components located within the sonde 10 to surface electronic equipment 15. The sonde 10 is provided with eccentering means, such as a resiliently actuated arm 16, urging one side of the instrument toward the borehole wall. The sonde 10 is also provided, on its side in contact with the wall, with a pad 17 which is urged against the wall by two resiliently actuated arms 18 so as to follow as well as possible all the irregularities of this wall.

The pad 17 includes, disposed along the same generatrix of the sonde, a gamma ray source 19, a short-spaced gamma ray detector 20, and a long-spaced gamma ray detector 21, both of scintillation type and mounted in a longitudinal recess 22 of the pad. A shield 23, opaque to gamma rays and preferably formed of tungsten, is provided on the external face of the pad 17.

The source 19, preferably formed of cesium 137 that emits gamma rays of 662 keV, is disposed at the bottom of a cylindrical collimating conduit 24 which is directed toward the borehole wall and passes through the wall-engaging shield 23 perpendicular to the pad axis. This recess is closed by a window 25 formed of a material transparent to gamma rays, such as an epoxy resin. The collimating conduit 24 is surrounded by a shielding material 26 of high density, such as tungsten, which prevents any direct effect of the gamma rays from the source on the detectors.

The short-spaced detector 20 includes a scintillator crystal 27 optically coupled to a photomulitplier 28. The crystal 27 is located substantially on the axis of the recess 22 at about 11cm from the source 19, behind a collimating conduit 29 closed by a gamma ray transparent material, such as an epoxy resin. This collimating conduit is inclined toward the source 19 and passes through the shield 26 at an angle of approximately 45° with respect to the pad axis. The long-spaced detector 21 also includes a scintillator crystal 30 optically coupled to a photomultiplier 31. The crystal 30 is mounted at about 36cm from the collimating conduit 25, immediately behind a gamma transparent protection window 32 which passes through the pad wall and the shield 23.

The above pad structure represents an optimal disposition for which the near detector 20 is principally sensitive to gamma rays which have diffused the materials near the borehole wall and in particular in the mudcake 14, whereas the far detector 21 is principally sensitive to gamma rays which have diffused in the formations 13.

The output pulses from the detectors 20 and 21 are applied to an electronics cartridge 33 located in the upper part of the sonde 10. The cartridge 33 includes an analysis stage 34 shown in FIG. 2 and a conventional telemetry stage 35 which serves to suitably process the signals from the analysis stage 34 for application to the cable 11 for transmission to the surface equipment 15.

As shown in FIG. 2, the output of the short-spaced detector 20 is applied, through an amplifier 36, to three voltage comparators 37, 38 and 39 whose references are pulse amplitudes corresponding to radiation energies $E_1$, $E_2$ and $E_3$ respectively. The energies $E_1$ and $E_2$ define the limits of a lower window covering back-scattered gamma rays which have undergone relatively high attenuation, whereas the energies $E_2$ and $E_3$ define the limits of an upper window covering back-scattered gamma rays which have undergone relatively low attenuation. The output of the comparator 37 is applied to one input of a two-input AND gate 40, whereas the output of the comparator 38 is applied to the second input of this gate through an inverter circuit 41. The output of the comparator 38 is also connected to one input of a two-input AND gate 42, whereas the output of the comparator 39 is connected to the second input of this gate through an inverter circuit 43.

It can thus be seen that the output pulses of the amplifier 36 whose amplitude corresponds to detected gamma rays having an energy lower than $E_1$ have no effect on the three voltage comparators 37, 38 and 39 whose output levels remain in the logic state 0. Therefore, the AND gates 40 and 42 remain blocked. The output pulses of the amplifier 36 whose amplitude corresponds to detected gamma rays having an energy higher than $E_3$ trigger the three voltage comparators; however, due to the action of the two inverters 41 and 43, the AND gates 40 and 42 are still blocked. By contrast, the pulses with an amplitude corresponding to an energy between $E_1$ and $E_2$ trigger the comparator 37, but do not trigger the comparator 38. These pulses are thus transmitted by the AND gate 40. Similarly, the pulses with an amplitude corresponding to an energy between $E_2$ and $E_3$ trigger the comparators 37 and 38, but do not trigger the comparator 39. Due to the combined actions of the three comparators and the two inverters, the AND gate 40 remains blocked but the AND gate 42 transmits these pulses. Thus, in brief, the AND gate 40 produces an output pulse for every pulse from the amplifier 36 corresponding to a detected gamma ray with an energy between $E_1$ and $E_2$, whereas the AND gate 42 produces an output pulse for every pulse from the amplifier 36 corresponding to a detected gamma ray with an energy comprised between $E_2$ and $E_3$.

The output of the long-spaced detector 21 is connected, through an amplifier 44, to two voltage comparators 45 and 46 whose references are pulse amplitudes corresponding to radiation energies $E_4$ and $E_5$ respectively. These two values define the limits of an energy window covering back-scattered gamma rays whose energy has been degraded principally by Compton effect. The output of the comparator 45 is directly connected to one input of a two-input AND gate 47, whereas the output of the comparator 46 is connected to the second input of this gate through an inverter circuit 48. It can be seen very easily, without describing in detail the operation of this circuit (which is similar to the operation of the circuit associated to the short-spaced detector 20) that the AND gate 47 produces an output pulse for every pulse from the amplifier 44 whose amplitude corresponds to a detected gamma ray having an energy between $E_4$ and $E_5$.

Concerning now the choice of the energies $E_1$, $E_3$, $E_4$ and $E_5$, it results from the foregoing descriptions that (1) the two lower limits $E_1$ and $E_4$ should be taken beyond the low energy part of the spectrum of the detected gamma rays which depends on the average atomic number of the adjacent medium (generally beyond 100 kev), and (2) the two upper limits $E_3$ and $E_5$ should be lower than the energy of the gamma rays emitted by the source. As for the intermediate limit $E_2$, it will be advantageously taken in the middle of the energy range $E_1$-$E_3$.

It is easy to understand that the specific energy selected for each of the above limits is mainly a matter of optimization so as to obtain the best possible sensitivity to gamma rays from the source which have been degraded only by Compton effect, to those which have diffused principally in materials immediately adjacent to the borehole and to those which have diffused principally in materials near the borehole but not immediately adjacent to its wall. This optimization depends not only on the source 19, the detectors 20 and 21, the spacings between the source and the detectors, but also on the angle between the collimation conduits 24 and 29 of the source 19 and the short-spacing detector 20. With a cesium 137 source, the values of the energy limits will advantageously be in the following ranges:

$E_1$ and $E_4$ between 100 and 200 keV;
$E_2$ between 300 and 360 keV;
$E_3$ and $E_5$ between 450 and 600 keV.

With the above-described pad structure, the following energy values have been found to be appropriate:

$E_1 = E_4 = 150$ keV;
$E_2 = 330$ keV;
$E_3 = E_5 = 500$ kev;

The output of the three AND gates 40, 42 and 47 of the analysis stage 34 are applied to the sonde telemetry stage 35, which transmits the selected pulses to the surface equipment 15 through the cable 11. As shown in FIG. 1, surface equipment 15 includes a conventional processing stage 49, including suitable amplifier and pulse separation circuits so that pulses corresponding to the output of the three AND gates 40, 42 and 47 may be separated and delivered on three distinct outputs. These outputs are respectively connected to three individual counting rate meters 50, 51 and 52, which produce output signals varying in accordance with the rates of occurrence $N_L$, $N_S$ and $N_S'$ of the pulses transmitted by the gates 47, 42 and 40 respectively. The outputs of the counting rate meters are then applied to a computer module 53, which functions to produce a doubly corrected density signal sent to a trace recorder 54 in order to provide a density log corresponding to the true formation density.

Instead of merely transmitting individual pulses to the surface, it is possible to accumulate the output pulses of the AND gates 40, 42 and 47 in an appropriate memory unit within the sonde 10. Digitally coded count rates are then transmitted to the surface for use by the computer module 53. One such technique is described in U.S. patent application Ser. No. 563,507, filed on Mar. 31, 1975, by W. B. Nelligan and assigned to the assignee of this application.

Before describing in detail the operations performed by the computer 53 on the three count rates $N_L$, $N_S$ and $N_S'$ to derive the true formation density, a general discussion of the method will now be given.

As already mentioned, the long-spaced count rate $N_L$, measured in the energy window $E_4$-$E_5$, is representative of the number of back-scattered gamma rays from the source 19 which have diffused in the formation 13 adjacent to the pad 17, but also in the mudcake 14 between the pad and these formations. Therefore, the density $d_L$ that can be derived from the count rate $N_L$ does not reflect exactly the formation density, the error being a function of the thickness and the density of the materials between the pad and the formation. A correction of this apparent density is therefore needed. This correction is performed from the two short-spaced count rates $N_S$ and $N_S'$.

The short-spaced count rate $N_S$ measured in the upper energy window $E_1$-$E_2$ is a representation of the number of gamma rays from the source 19 which diffuse in the materials near the pad 17. As the energy range $E_1$-$E_2$ covers gamma rays which have undergone low attenuation, $N_S$ is representative of the density of the materials contained in a relatively thin layer immediately adjacent to the pad. Typically, with the above-described tool, the thickness of this layer is about 30mm. The density $d_S$, derived from the count rate $N_S$, can therefore be used to correct the apparent density $d_L$ for the effect of this layer. The correction is performed with the help of a calibration function giving the density compensation $\Delta d$ that must be applied to the apparent density $d_L$ as a function of the difference $(d_L - d_S)$. The calibration function is based on readings in laboratory formations of high purity and accurately known densities. Such a function depends, of course, on each particular tool, but its general shape is that shown in the function former 55 of FIG. 1.

As the above correction compensates only for the effect of a thin layer of materials immediately adjacent to the pad, a second correction is necessary to compensate for the effect of materials near, but not immediately adjacent to, the pad. This correction uses the short-spaced count rate $N_S'$ measured in the lower energy range $E_2$-$E_3$. As this energy range covers gamma rays which have undergone relatively high attenuation, $N_S'$ is representative of the density of materials contained in a second layer not immediately adjacent to the pad. The density $d_S'$, derived from the count rate $N_S'$, can therefore be used to correct the apparent density $d_L$ for the effect of this second layer of materials not covered by the first compensation. The correction is performed with the help of a second calibration function giving the second density compensation $\Delta d'$ that must be applied to the apparent density $N_L$ as a function of the difference $(d_S - d_S')$. As for the first calibration function, this second function, whose general shape is shown in the function former 56, is based on readings in laboratory formations of high purity and accurately known densities.

The density $d$, which is finally considered as being the true formation density, is the sum: $d_L + \Delta d + \Delta d'$. With the above-described tool, the density $d$ is very well compensated for the effect of materials contained in a layer having a thickness of about 60mm. This value covers not only thick mudcakes, but also the majority of the altered shales.

It has been shown that significantly improved density readings as compared to prior art techniques are obtained if the densities $d_L$, $d_S$ and $d_S'$ are calculated from the count rates $N_L$, $N_S$ and $N_S'$ according to the following relationships:

$$d_L = d_{Lo} + A_L \log N_L,$$

$$d_S = d_{So} + A_S \log (N_S/d_L),$$

$$d_S' = d_{So}' + A_S' \log N_S',$$

$d_{Lo}$, $d_{So}$, $d_{So}'$, $A_L$, $A_S$ and $A_S'$ being empirically derived constants.

It can be seen that $d_L$ and $d_S'$ are respectively determined from $N_L$ and $N_S'$ alone, whereas $d_S$ is determined from the ratio $N_S/D_L$. This difference is due to the fact that $d_L$ and $d_S'$ are generally representative of a non homogeneous medium (mudcake and formation), whereas $d_S$ is representative of a homogeneous medium (mudcake).

Returning now to FIG. 1, the computer module 53 is of the analog type and includes a first density calculation stage 57 which is connected to the output of the $N_L$ counting rate meter 50 and provides at its output a signal representing the quantity:

$$d_{Lo} + A_L \log N_L,$$

that is $d_L$.

The output of the $N_S$ counting meter 51 and the density calculation stage 57 are both applied to a second density calculation stage 58 that provides at its output a signal representing the quantity:

$$d_{So}' + A_S' \log N_S',$$

that is $d_S'$.

The output of the calculation stages 57 and 58 are both connected to a difference circuit 60 that produces an output signal representing the difference $(d_L - d_S)$. The outputs of the calculation stages 58 and 59 are both connected to another difference circuit 61 that produces an output signal representing the difference $(d_S - d_S')$. The output of the difference circuit is applied to a function former 55 constructed to provide an input-to-output transfer characteristic simulating the previously described calibration function. Function former 55 therefore produces at its output a signal that represents the first density compensation $\Delta d$ corresponding to the particular value of the difference $(d_L - d_S)$. In a similar way, the output of the difference circuit 61 is applied to a function former 56 constructed to provide an input-to-output transfer characteristic simulating the represented calibration function. This function former therefore provides at its output a signal that represents the second density compensation $\Delta d'$ corresponding to the particular value of the difference $(d_S - d_S')$.

The function formers 55 and 56 preferably take the form of operational amplifiers having resistor-diode networks in the individual amplifier feedback circuits. The gain adjustment provided by these feedback resistances enables the amplifiers to provide the desired input-to-output transfer characteristics.

The output of the density calculation stage 57 and the two function formers 55 and 56 are applied to a summation circuit 62 that produces an output signal representing the doubly compensated density:

$$d = d_L + \Delta d + \Delta d'.$$

This signal is applied to the recorder 54.

Alternatively, the computer module used to derive the doubly compensated formation density from the three count rates can be of the digital type. In this case, the two calibration curves used for determining the density corrections $\Delta d$ and $\Delta d'$ are sampled and stored in permanent digital memories. The constants $$d_{Lo}, d_{So}, d_{So}', A_L, A_S \text{ and } A_S'$$

are also stored in permanent memories, whereas the necessary instructions are provided by specially wired circuits. Typically, the principal operations performed by the digital computer can be as follows:

Calculation of $d_L$
Calculation of $d_S$
Calculation of the difference $(d_L - d_S)$
Extraction of the first density correction $\Delta d$
Calculation of $d_S'$
Calculation of the difference $(d_S - d_S')$
Extraction of the second density correction $\Delta d'$
Calculation of the sum $d_L + \Delta d + \Delta d'$.

While there has been described what is at present considered to be a preferred embodiment of this invention, it will be obvious to those skilled in the art that various changes and modifications may be made within the spirit and scope of the invention.

I claim:

1. A method for determining the density of a geological formation surrounding a borehole, irradiated by gamma rays, comprising:
   producing a measurement of the number of backscattered gamma rays which have principally diffused in said formation; and
   producing at least two separate measurements of the numbers of backscattered gamma rays which have principally diffused respectively in at least two successive layers of materials near the borehole wall, for use in obtaining an indication of the formation density compensated for the effect of said materials.

2. A method for determining the density of a geological formation surrounding a borehole, irradiated by gamma rays, comprising:
   producing a measurement of the number of backscattered gamma rays which have diffused in said formation;

producing at least two separate measurements of the numbers of backscattered gamma rays which have principally diffused respectively in at least two successive layers of materials near the borehole wall; and combining said measurements to produce an indication of the formation density compensated for the effect of said materials.

3. A method for determining the density of a geological formation surrounding a borehole, irradiated by a source of gamma rays, comprising the steps of:

producing a first measurement of the number of backscattered gamma rays which have principally diffused in said formation;

producing a second measurement of the number of backscattered gamma rays which have principally diffused in materials immediately adjacent to the borehole;

producing a third measurement of the number of backscattered gamma rays which have principally diffused in materials near the borehole but not immediately adjacent to its wall; and obtaining from said first, second and third measurements an indication of the formation density compensated both for the effect of materials immediately adjacent to the borehole and the effect of materials near the borehole but not immediately adjacent to its wall.

4. The method of claim 3, wherein said first measurement is produced from the count rate of a detector located at a relatively long distance from the source.

5. The method of claim 4, wherein said first measurement is produced from the count rate of said detector in an energy range covering back-scattered gamma rays whose energy has generally been degraded by Compton effect.

6. The method of claim 5, wherein the source of gamma rays is cesium 137 and said energy range has its lower limit between 100 and 200 keV and its upper limit between 450 and 600 keV.

7. The method of claim 3, wherein said second and third measurements are produced from the count rate of a detector located at a relatively short distance from the source.

8. The method of claim 7, wherein said second and third measurements are produced from the count rate of said detector in upper and lower energy ranges covering back-scattered gamma rays which have undergone relatively low and high attenuations respectively.

9. The method of claim 8, wherein the source of gamma rays is cesium 137, said upper energy range has its lower limit between 300 and 360 keV and its upper limit between 450 and 600 keV, and said lower energy range has its lower limit between 100 and 200 keV and its upper limit between 300 and 360 keV.

10. The method of claim 3, wherein said step of obtaining comprises:

producing first, second, and third density measurements from said first, second and third gamma ray measurements respectively;

deriving a first density correction from the difference between the first and second density measurements;

deriving a second density correction from the difference between the second and third density measurements; and combining said first and second density corrections with the first density measurement.

11. The method of claim 10, wherein said first, second and third density measurements $d_L$, $d_S$ and $d_S'$ respectively are produced from the first, second and third gamma ray measurements $N_L$, $N_S$ and $N_S'$ respectively by solving the equations:

$$d_L = d_{Lo} + A_L \log N_L$$

$$d_S = d_{So} + A_S \log (N_L/d_L)$$

$$d_S' = d_{So}' + A_S' \log N_S',$$

$d_{Lo}$, $d_{So}$, $d_{So}'$, $A_L$, $A_S$ and $A_S'$ being empirically derived constants.

12. The method of claim 10, wherein said first and second density corrections are derived by using empirical relationships based on density measurements in formations of known densities.

13. An apparatus for measuring the density of a geological formation surrounding a borehole, comprising:

a gamma ray source for irradiating the formation;

a first gamma ray detector located at a relatively long distance from the source so as to principally receive gamma rays which have diffused in the formation;

a second gamma ray detector located at a relatively short distance from the source so as to principally receive gamma rays which have diffused in materials near the borehole;

a first circuit for measuring the count rate of the output pulses of the first detector in an amplitude window corresponding to detected gamma rays whose energy has generally been degraded by Compton effect;

a second circuit for measuring the count rate of the output pulses of the second detector in an amplitude window corresponding to detected gamma rays which have undergone relatively low attenuation;

a third circuit for measuring the count rate of the output pulses of the second detector in an amplitude window corresponding to detected gamma rays which have undergone relatively high attenuation; and means for determining, from said first, second and third count rates, the density of the formation compensated both for the effect of materials immediately adjacent to the borehole and the effect of materials near the borehole but not immediately adjacent to its wall.

14. The apparatus of claim 13, wherein said determining means includes:

means for calculating first, second and third densities from said first, second and third count rates respectively;

means for deriving a first density correction from the difference between said first and second densities;

means for deriving a second density correction from the difference between said second and third densities; and means for adding said first and second density corrections to said first density.

15. The apparatus of claim 14, wherein said means for calculating the first, second and third densities $d_L$, $d_S$ and $d_S'$ respectively from the first, second and third count rates $N_L$, $N_S$ and $N_S'$ respectively are arranged to solve the equations:

$$d_L = d_{Lo} + A_L \log N_L$$

$$d_S = d_{So} + A_S \log (N_L/d_L)$$

$$d_S' = d_{So}' + A_S' \log N_S',$$

$d_L$, $d_{So}$, $d_{So}'$, $A_L$, $A_S$ and $A_S'$ being empirically derived constants.

16. The apparatus of claim 14, wherein said determining means is of the analogue type, and each density correction deriving means includes a function former with a transfer characteristic simulating an empirical relationship between said difference and said density correction, which is based on density measurements in formations of known densities.

17. The apparatus of claim 14, wherein said determining means is of the digital type, and each density correction deriving means includes a permanent digital storage network for storing a set of samples simulating an empirical relationship between said difference and said density correction, which is based on density measurements in formations of known densities.

18. The apparatus of claim 13, wherein the second gamma ray detector is located at the bottom of a collimating conduit inclined in the direction of the gamma ray source.

* * * * *